United States Patent [19]

Flanigan et al.

[11] Patent Number: 5,053,082

[45] Date of Patent: Oct. 1, 1991

[54] PROCESS AND APPARATUS FOR CLEANING PARTICULATE SOLIDS

[75] Inventors: David A. Flanigan, Cleveland, Okla.; Joe K. Heilhecker; Robert E. Williams, both of Houston, Tex.

[73] Assignee: Conoco Inc., Ponca City, Okla.

[21] Appl. No.: 487,351

[22] Filed: Feb. 28, 1991

[51] Int. Cl.$^5$ .................... B08B 3/08; B08B 13/00
[52] U.S. Cl. ..................... 134/25.1; 134/26; 134/33; 134/42; 175/66; 175/206; 210/512.1; 210/787
[58] Field of Search ............... 134/25.1, 26, 33, 42; 175/66, 206; 210/787, 512.1

[56] References Cited

U.S. PATENT DOCUMENTS

| | | | |
|---|---|---|---|
| 2,266,586 | 12/1941 | Branum | 175/208 |
| 2,965,522 | 12/1960 | Crespin et al. | 134/12 |
| 3,658,015 | 4/1972 | Griffin et al. | 134/12 |
| 3,688,781 | 9/1972 | Talley | 134/10 |
| 3,693,733 | 9/1972 | Teague | 134/25.1 |
| 3,693,951 | 9/1972 | Lawhon et al. | 175/56 |
| 3,716,480 | 2/1973 | Finley et al. | 175/56 |
| 3,860,019 | 1/1975 | Teague | 175/66 |
| 3,959,139 | 5/1976 | El-Hinde | 210/512.1 |
| 4,040,866 | 8/1977 | Mondshine | 134/26 |
| 4,139,462 | 2/1979 | Sample | 210/74 |
| 4,175,039 | 11/1979 | Fisher | 210/74 |
| 4,209,381 | 6/1980 | Kelly | 208/8 LE |
| 4,288,329 | 9/1981 | Duval | 134/12 |
| 4,304,609 | 12/1981 | Morris | 134/29 |
| 4,395,338 | 7/1983 | Rowton | 210/747 |
| 4,406,796 | 9/1983 | Duval | 134/12 |
| 4,411,074 | 10/1983 | Daly | 134/19 |
| 4,434,028 | 2/1984 | Eppig et al. | 196/14.52 |
| 4,434,061 | 2/1984 | McDowell | 210/787 |
| 4,546,783 | 10/1985 | Lott | 134/109 |
| 4,595,422 | 6/1986 | Hill et al. | 134/19 |
| 4,606,283 | 8/1986 | Des Ormeaux et al. | 110/250 |
| 4,606,774 | 8/1986 | Morris | 134/10 |
| 4,662,948 | 5/1987 | Weitzman | 134/25.1 |
| 4,678,558 | 7/1987 | Belluteau et al. | 208/390 |
| 4,683,963 | 8/1987 | Skinner | 175/66 |
| 4,726,301 | 2/1988 | Des Ormeaux et al. | 110/250 |
| 4,744,890 | 5/1988 | Miller et al. | 210/512.1 |
| 4,836,302 | 6/1989 | Heilhecker et al. | 175/66 |
| 4,844,812 | 7/1989 | Haynes et al. | 210/787 |

FOREIGN PATENT DOCUMENTS 0005273 5/1979 European Pat. Off. .
WO82/01737 5/1982 PCT Int'l Appl. .

OTHER PUBLICATIONS

Oil and Gas Journal, Aug. 14, 1972, pp. 73–76, "Cuttings Can Meet Offshore Environment Specifications".

Primary Examiner—Asok Pal

[57] ABSTRACT

A system for cleaning solids contaminated with solvent-soluble contaminants. The system, which includes both process and apparatus, comprises slurrying of the solids with a solvent, feeding the slurry to a cyclone separation zone integrally connected to a countercurrent extraction zone, separating the slurry into an overflow stream which includes solvent and fine particles of solids and an underflow stream which includes mostly coarse particles of solids in the cyclone separation zone, processing the overflow stream in a cleaning zone with additional solvent, processing the underflow stream in countercurrent relationship with additional solvent through the countercurrent extraction zone, combining the cleaned coarse particles of solids withdrawn from the extraction zone with the cleaned fine particles of solids withdrawn from the cleaning zone and centrifuging the combined cleaned particles to remove residual solvent and recovering the combined solids having reduced contamination for disposal.

38 Claims, 3 Drawing Sheets

PROCESS AND APPARATUS FOR CLEANING PARTICULATE SOLIDS

FIELD OF INVENTION

This invention relates to the removal of solvent soluble contaminants from particulate solids. More particularly, the invention relates to a process and apparatus for removing or cleaning organic and inorganic contaminants from particulate solids and has particular application to removing and cleaning oil from oil-contaminated drill cutting solids resulting from oil and gas well drilling operations.

BACKGROUND OF THE INVENTION

In general, a variety of techniques have been used in the past to remove contaminants from particulate solids. For example, U.S. Pat. No. 2,965,522 describes a technique for regenerating fouled filter aids by water washing to remove the foulants. The technique involves passing the fouled filter aid through a series of hydrocyclones with separate water streams being introduced to each hydrocyclone. U.S. Pat. No. 4,288,329 and U.S. Pat. No. 4,406,796 describe a technique for cleaning mill scale with solvents to remove oil and water. With increasing emphasis on environmental concerns, techniques have been developed to remove contaminants from soil as exemplified in U.S. Pat. No. 4,606,774 and U.S. Pat. No. 4,662,948.

Particular concerns with removal of contaminants from particulate solids have arisen in the drilling of oil and gas wells wherein drill cuttings generated during drilling operations are flushed from the wellbore by drilling fluids (sometimes referred to as "drilling muds"). A serious problem exists with disposal of these drill cuttings and other residual solids after separation from the drilling mud because of oil contamination After being separated from the drilling mud, these solids have oil on their surfaces and sometimes within their porous structure. This is particularly true when an oil-based drilling mud is employed although formation oil may also be present regardless of the type of drilling mud used. Because of the increasing environmental concerns, it is essential to have economic means to clean these oil-contaminated drill cutting solids and enable disposal in an environmentally acceptable manner. This is very significant in offshore operations where it is desirable to be able to discharge the solids overboard from the drilling rigs and avoid having to transport them to shore for disposal.

With respect to drill cuttings, a variety of techniques have been suggested for dealing with this problem.

For example, the use of surfactant solutions to wash drill cuttings to remove oil and other contamination has been suggested in U.S. Pat. No. 3,688,781, U.S. Pat. No. 3,693,733, U.S. Pat. No. 3,716,480, U.S. Pat. No. 3,860,019, U.S. Pat. No. 4,175,039, U.S. Pat. No. 4,546,783, U.S. Pat. No. 4,595,422 and U.S. Pat. No. 4,645,608. These approaches attempt to wash adsorbed oil-based mud from the surface of the drill cuttings and have been largely unsuccessful because oil-based muds are specially formulated with powerful oil wetting agents that resist the detergent action of aqueous wash solutions. Additionally, detergent-laden water, which may be even more toxic to marine organisms than the oil on the drill solids, is continuously discharged into the marine environment.

Steam stripping of the cuttings to remove oil contamination has been suggested in U.S. Pat. No. 4,209,381. In these techniques, steam is used to strip the more volatile oils from oily drill cuttings followed in some cases by distillation of the remaining solids to remove the higher boiling oil fractions. The methods are particularly impractical offshore because of the excessively high energy requirements to generate the quantity of steam needed and the high temperatures needed to distill the oil.

Other thermal methods involving heating of the cuttings to volatilize or incinerate the oil contamination have been suggested in U.S. Pat. No. 3,693,951, U.S. Pat. No. 4,139,462, U.S. Pat. No. 4,304,609, U.S. Pat. No. 4,411,074, U.S. 4,606,283, U.S. Pat. No. 4,683,963, U.S. Pat. No. 4,726,301 and EP Application Publication No. 0005273. Typically, the high temperatures required for these processes is supplied by electrical resistance heating, electrical induction heating, infra-red heaters, or high temperature heat transfer fluids. The methods have been at least partly unsuccessful for reasons already cited. The total amount of energy to heat all of the solids and boil all of the liquids off the cuttings is excessively high. Also, it is very dangerous to operate any equipment offshore in which hydrocarbon vapors are generated at temperatures well above their flash point.

Solvent washing or extraction techniques to remove oil contamination from cuttings have been suggested in U.S. Pat. No. 4,040,866, U.S. Pat. No. 4,434,028, U.S. Pat. No. 4,836,302 and PCT Published Application No. WO82/01737.

In particular, U.S. Pat. No. 4,040,866 teaches the use of a mutual solvent to clean oily drill cuttings. A mutual solvent is one that is soluble in both oil and water. In this process, oily liquid is removed from the solids with a mutual solvent like ethylene glycol monobutyl ether; however, the mutual solvent and oil mixture remains on the cuttings and must be washed away with water followed by centrifuging to recover the cuttings. This method has proven impractical because two undesirable process streams are created. Large quantities of solvent (approximately equal to the original volume of oily liquid on the solids) are washed from the solids with water and discharged with the water into the environment. It is probable that the solvent is even more toxic to marine organisms than the oil which was removed from the cuttings Additionally, large volumes of mutual solvent become contaminated with dissolved oil and must be either discarded or purified and recycled. The cost of mutual solvents prohibits simple disposal. Further, the high boiling point and high latent heat of vaporization of mutual solvents make their separation from oil by distillation difficult, expensive and hazardous.

U.S. Pat. No. 4,434,028 teaches a high pressure process for the use of a solvent which is miscible with oil but essentially immiscible with water to clean oily drill cuttings. In this process, a substance that is typically a gas at ambient temperature and pressure is compressed sufficiently to convert the gas to a liquid which then becomes a suitable solvent for the oil associated with drill cuttings. The liquified gas is then flowed, batchwise, through a vessel packed with oily solids. When the solids have been washed sufficiently clean, the chamber is depressurized allowing the solvent to flash into a vapor, leaving the solids free of oil and solvent. The oil-contaminated solvent can also be flashed to a vapor to separate it from the oil and allow it to be recycled. This process has not been successful on offshore drill sites for several possible reasons. High pressure is required to convert the normally gaseous material to a liquid so it can dissolve the oil on the solids. Mechanical problems associated with moving solids repeatedly into and out of high pressure vessels without leakage are formidable. Also, the batchwise nature of the process is not compatible with the continuous process of drilling and generation of drill cuttings Finally, mechanical crushing of the cuttings prior to extraction requires heavy, bulky, maintenance-prone equipment which is especially undesirable for uses in offshore drilling operations U.S. Pat. No. 4,836,302 teaches a system for cleaning drill cuttings using a cleaning column. The system is stated to overcome many of the problems associated with the techniques described above and is contained so as to minimize solvent escaping to the atmosphere. However, the use of a cleaning column to process all the cuttings presents certain material handling problems with respect to the very fine particles of cuttings which may constitute a significant portion of the overall cuttings.

PCT Published Application No. WO82/01737 describes a technique for reducing oil contamination on drill cuttings which involves washing the contaminated drill cuttings, preferably after screening to remove fines and supernatant drilling mud, with a single halogenated solvent. The resulting slurry is then macerated and processed through a single continuously running decanter centrifuge to separate the cleaned solids. While the system will reduce oil contamination on drill cuttings, a substantial volume of solvent is required to achieve a given level of cleaning.

SUMMARY OF THE INVENTION

The present invention relates to a method comprising a unique sequence of steps for continuously removing or cleaning solvent soluble contamination from particulate solids and a corresponding apparatus. The invention has particular application to cleaning organic contamination from particulate solids such as in cleaning oil from drill cutting solids and employs solvents to dissolve and carry away contamination from the surfaces and pores of the solids.

While the present invention is described with reference to drill cutting solids, it is to be understood that the invention has wide application in cleaning contaminants from solids, e.g. cleaning various organic and inorganic contaminants from earthen materials using suitable solvents including water as well as other solvents more particularly described hereinafter.

Drill cutting solids, as this term is used herein, includes all solids that may be separated from the drilling mud returned from a wellbore during drilling operations. Although the majority of these solids comprise the actual borehole material cut from the formation, other solids materials will also usually be present including additives which are conventionally used in formulating drilling muds such as weighting agents (e.g. barite, hematite, etc.), fluid loss materials (e.g. miscellaneous fibrous materials, etc.) and other well known additives. These additives may be present in finely ground form, as is usual with weighting agents, or in larger regular or irregular forms, as may be the case with fluid loss additives. The actual borehole material contained in the solids will generally comprise a wide spectrum of sizes ranging from extremely fine particles to relatively coarse particles and the relative proportions will vary extensively with the types of formations being drilled.

In accordance with the invention, oil-contaminated drill cutting solids, after separation from the drilling mud, are mixed with suitable solvent to form a slurry. In the slurrying step, a significant portion of the oil-contamination becomes dissolved in the solvent. The solvent used to form the slurry may be free from any dissolved oil or, alternatively, depending on the degree of cleaning to be accomplished, may contain some dissolved oil as would be the case if a recycle solvent stream from a separation step later in the overall process is used.

The slurry is then fed to a cyclone separation zone integrally positioned at the top of a counter-current extraction zone. In the cyclone separation zone, the slurry is separated into first (overflow) and second (underflow) streams.

The first stream, comprising mostly the smaller particles of drill cutting solids (herein referred to as fines) together with a major portion of the solvent and dissolved oil, is withdrawn from the overflow of the cyclone separation zone. Removal of the majority of the solvent containing dissolved oil as the overflow in the cyclone separation zone reduces the amount of oil which otherwise would need to be removed in the extraction zone. In addition, separating the fines as the overflow reduces the difficulty in attempting to clean the fines in the extraction zone.

The first stream withdrawn as the overflow from the cyclone separation zone is subjected to centrifuging to separate the fines from the oily solvent. Alternatively, the first stream may be subjected to cyclone separation to separate the fines from the oily solvent. However, cyclone separation is more prone to possible plugging and does not remove as much of the oily solvent from the fines as with centrifuging. Centrifuging may be accomplished with a single centrifuge or with multiple centrifuges operating in parallel. This also applies if cyclone separators are used. Parallel operations may utilize a combination of cyclone separators and centrifuges.

The separated fines, which still contain some residual contaminating oil, are then sent to a cleaning zone where they are contacted with more solvent. Again, the solvent may contain some dissolved oil but, for maximum cleaning effectiveness, should be essentially free from any dissolved oil. A mixture of fines and solvent are then withdrawn from the cleaning zone and combined with the cleaned coarse drill cutting solids from the extraction zone as described hereinafter. Depending on the degree of contamination and the desired level of cleanliness, this mixture of fines and solvent may be subjected to one or more sequences of centrifuging or cyclone separation, each followed by treatment in a cleaning zone, before being combined with the cleaned coarse drill cutting solids. If sequencing is utilized, it may sometimes be desirable to use a cyclone separation-cleaning zone treatment followed by centrifuging-cleaning zone treatment. In sequencing, it may not be necessary to use a cleaning zone as part of the last sequence but rather simply discharge the fines from the last cyclone separator or centrifuge directly to the next stage of the process.

The second stream, comprising mostly coarse particles of oil contaminated drill cutting solids (which have been partially cleaned by the slurrying step) together with some oily solvent, is discharged from the underflow of the cyclone separation zone directly into an extraction zone. The underflow is appropriately sized so as to accommodate flow of the coarse particles without plugging.

An important feature of the present invention is the integral positioning of the cyclone separation zone at the top of the counter-current extraction zone. The integral positioning is such that the underflow of the cyclone separation zone is in direct contact with and thus discharges directly into the body of solvent contained in the upper region of the counter-current extraction zone. Preferably, the extraction zone is operated full of solvent. The arrangement advantageously utilizes the body of solvent in the upper region of the counter-current extraction zone to provide the necessary back pressure to control the underflow from the cyclone separation zone and thereby assure adequate separation between the fines and the majority of the solvent comprising the overflow and the more coarse particles with some solvent comprising the underflow from the cyclone separation zone. This control feature is important because it allows the underflow orifice to be sized sufficiently large to accommodate flow of the coarse particles while at the same time minimizing the amount of solvent flow through the underflow orifice thus enabling the majority of solvent laden with dissolved oil to discharge through the overflow orifice. Preferably, the diameter of the underflow orifice is about three times larger than the largest particle to reduce plugging. In the absence of this control feature, the underflow orifice would need to be smaller in size to provide the necessary back pressure to assure discharge of the majority of the solvent through the overflow orifice and could lead to plugging of the underflow by the coarse particles, particularly at low solvent to solids ratios.

In the extraction zone, solvent is introduced to the lower portion of the zone and flows upward through the zone. The solvent introduced to the extraction zone may contain some dissolved oil depending on the degree of cleaning desired. For maximum cleaning, the solvent should be free from any dissolved oil.

The drill cutting solids introduced to the extraction zone from the underflow of the cyclone separation zone are allowed to fall by gravity through the extraction zone in counter-current flow with the solvent introduced to lower portion of the extraction zone. During the counter-current flow, the downwardly moving drill cutting solids are intimately contacted by the upwardly flowing solvent and the contaminating oil on the solids becomes dissolved in the solvent. As is apparent, as the solvent moves upward through the extraction zone, increasing amounts of the contaminating oil become dissolved in the solvent so that the solvent in the upper portion of the extraction zone is heavily laden with oil where it is withdrawn from the extraction zone. Of course, any oily solvent entering the extraction zone with the coarse drill cutting solids combines with this solvent in the upper region of the extraction zone and is also withdrawn. The thus cleaned drill cutting solids accumulate at the bottom of the extraction zone and are withdrawn together with some of the solvent and combined with the cleaned fines from the cleaning zone.

As previously indicated, for maximum cleaning effectiveness, it is desirable to use fresh oil-free solvent in initially slurrying the drill cutting solids, in the extraction zone and in the cleaning zone. However, as will be recognized, depending on the degree of cleaning to be accomplished, the solvent may contain some dissolved oil which may vary in concentration according to whether it is used in the slurrying zone, the extraction zone or the cleaning zone. In general, since the oil is infinitely soluble in the solvent, appropriate concentration gradients must be maintained when a solvent already containing some dissolved oil is used in each of these zones as is understood by those skilled in the art.

The combined cleaned coarse drill cutting solids and the fines are then centrifuged to separate the coarse solids and fines from the residual solvent that is present. The combined coarse solids and fines are then introduced to and continuously conveyed through a heating zone operated at temperatures sufficient to volatilize any residual solvent remaining on the coarse solids and fines. During this time, some of the water that may be contained within the pores of the combined solids may also be volatilized. A resulting effect of volatilization is to further strip residual oil that may still be present on the coarse solids and fines.

Further stripping of residual oil in the heating zone can be enhanced by adding fresh solvent to the combined coarse solids and fines prior to introduction to the heating zone. The fresh solvent is in addition to the residual solvent which remains on the combined coarse solids and fines after centrifuging. The subsequent volatilization of both the added fresh solvent and residual solvent causes further stripping of residual oil beyond that which would otherwise occur.

The dried coarse solids and fines withdrawn from the heating zone are substantially reduced of oil contamination and can be substantially free of oil contamination if suitable solvent conditions are used to maximize cleaning. The process and apparatus of the present invention can be employed to sufficiently clean the drill cutting solids so that they may be discharged to the surrounding environment and, in the case of offshore operations, disposal may be directly to the sea.

As will be appreciated by those skilled in the art, the above process may be applied to a wide variety of cleaning applications. In the event the solids to be cleaned are contaminated with water-soluble contaminants and water is used as the solvent, it may be possible to eliminate the heating zone and simply recover wet solids having reduced contamination.

DETAILED DESCRIPTION OF THE INVENTION

Figure 1:
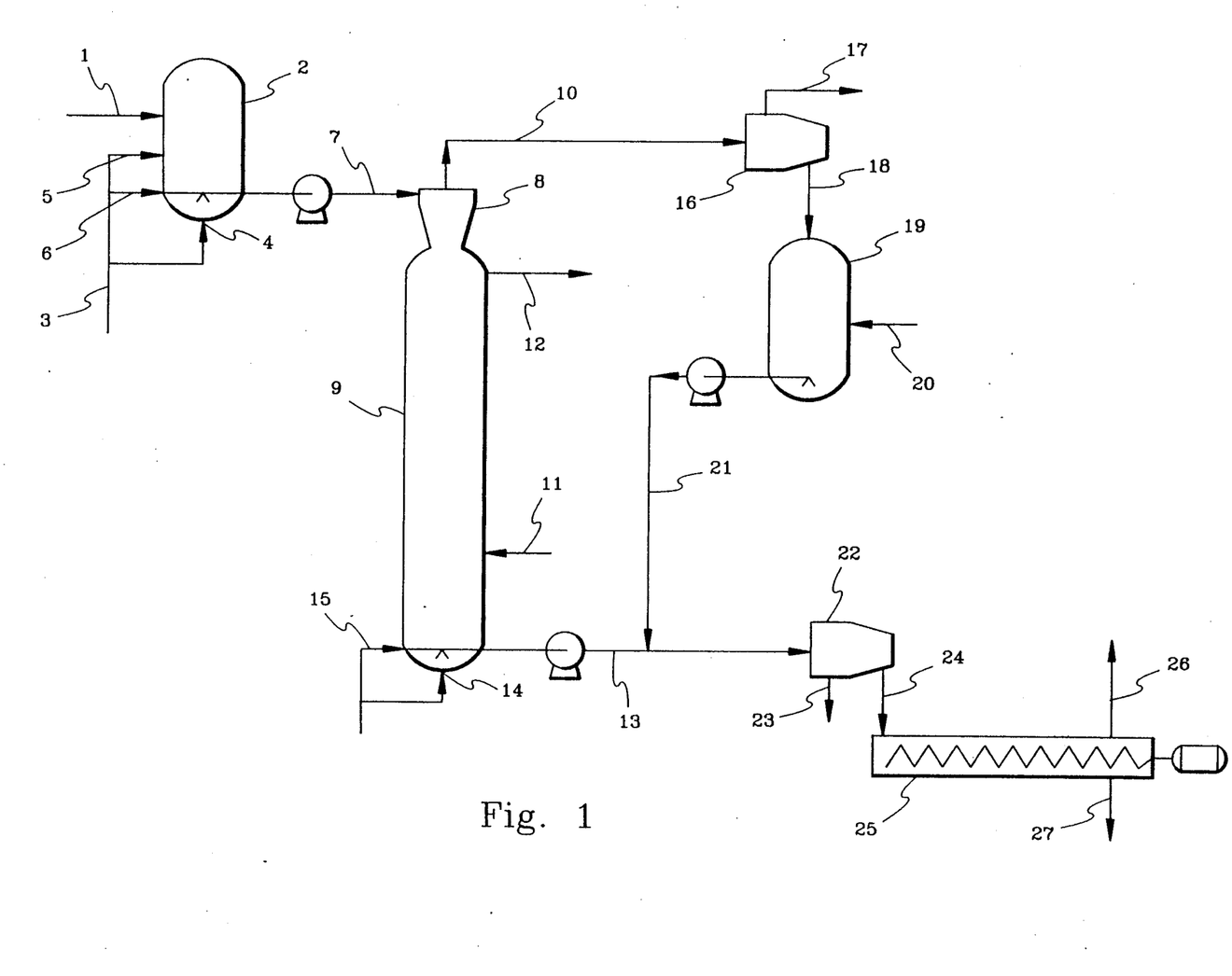
FIG. 1 is a schematic diagram illustrating the basic process and apparatus of the invention which is suitable in general for the removal of solvent soluble contaminants from particulate solids.

With reference to FIG. 1, particulate solids contaminated with solvent-soluble contaminants are introduced via line 1 to slurry tank 2. A suitable solvent for the contaminants is also introduced to slurry tank 2 by way of line 3. The solvent may be introduced in any convenient manner so as to mix with the contaminated particulate solids in the slurry tank. This may include injection through one or more entry ports 4 in the bottom of the slurry tank in a manner which provides some fluidization to the solids and minimizes heavy accumulation of solids. Side entry solvent injection via line 5 may also be used. A portion of the solvent may also be introduced via line 6 to assist in withdrawal of the slurry through line 7. Suitable fluidization and withdrawal systems are described in U.S. Pat. No. 3,993,359 and U.S. Pat. No. 4,586,852.

In slurry tank 2, some of the contaminants on the particulate solids become dissolved in the solvent. The solvent used will depend on the nature of the contaminants to be removed. For example, water may be used when the contaminants are water-soluble materials. Organic solvents, such as hydrocarbons and halogenated hydrocarbons, may be used when oleaginous contaminants are to be removed.

Selection of an appropriate solvent may entail a further consideration. It has been found that the diameter of the extraction column (described hereinafter) having a specified height required to achieve a certain degree of cleaning is inversely related to the difference in densities between the solids being cleaned and the solvent. Thus, in cleaning solids having a certain average density, the size of the extraction column can be reduced by selecting a solvent having the lowest density. This may be advantageous in situations where size and weight of the overall apparatus are important considerations.

The slurry of contaminated solids and solvent are then introduced via line 7 to a cyclone separator 8 which is mounted on top of extraction column 9. The cyclone separator 8 is designed for liquid-solids separation with the overflow and underflow sized to accommodate separation of fine particles and a major portion of the solvent from the coarse solids and a minor portion of the solvent, respectively. The fine particles and a major portion of the solvent containing dissolved contaminants are withdrawn as the overflow via line 10 while the coarse solids with minor amounts of solvent exit the cyclone separator as the underflow and are discharged directly into the body of solvent contained in the extraction column 9. Preferably, the amount of solvent exiting the cyclone separator with the coarse solids should be in the range of about 10% to about 20% of the volume of solids. It is essential that the underflow discharge be in contact with the body of solvent to assure the necessary back pressure for operation of the cyclone separators as explained in further detail hereinafter In the extraction column, solvent is introduced near the bottom of the column through line 11 and solvent containing dissolved contaminants is withdrawn near the top of the column through line 12. In this manner, solvent is caused to flow upward through the column while the contaminated solids discharged from the underflow of the cyclone separator 8 fall by gravity to the bottom of the column in countercurrent relationship. During this countercurrent flow, the solids are intimately contacted by the solvent and the contaminants on the solids become dissolved in the solvent. Although the solvent introduced to the extraction column may contain relatively low levels of dissolved contaminants, for maximum cleaning effectiveness, the solvent should be free from dissolved contaminants. The solvent level within the column is maintained so as to be at least contiguous with the area at which the underflow exits from the cyclone separator allowing the underflow to discharge directly into the body of solvent, i.e. discharge is within the body of solvent. This feature is important since the body of solvent in the column serves to provide the necessary back pressure to the cyclone separator while still allowing the underflow to be of adequate size to accommodate passage of the coarse solids without plugging. However, the volume of solvent passing through the column must not be so great that the solvent is allowed to flood the cyclone separator. It is preferred that essentially no solvent from the extraction column enters the cyclone separator.

Coarse solids which have been cleaned by the countercurrent flow of solvent in the column are withdrawn through line 13. As with the slurry tank 2, additional solvent may be introduced to the lower region of the column through one or more ports 14 to provide some fluidization to the solids to minimize dense accumulation of the solids which may interfere with withdrawal. A portion of the solvent may also be introduced via line 15 as part of the withdrawal system for the coarse solids.

Next, referring to the fines and solvent containing dissolved contaminants exiting as the overflow 10 from the cyclone separator, the overflow mixture is introduced to a centrifuge 16 where the contaminated solvent is separated from the fines and discharged through line 17. As mentioned previously, centrifuge 16 may alternatively be a cyclone separator, but in such event, it is desirable to employ at least two (and preferably three) cyclone separators in series. Further, multiple centrifuges or cyclone separators or multiple series of cyclone separators arranged to operate in parallel may be used. The separated fines, which are still wet with contaminated solvent, are discharged via line 18 to cleaning tank 19. Solvent is also introduced to the cleaning tank 19 via line 20 to form a slurry with the wet fines and dilute the contaminated solvent accompanying the fines as well as dissolve further contaminants. Again, for maximum cleaning effectiveness, the solvent introduced via line 20 should be free of dissolved contaminants. The further cleaned fines together with some solvent are withdrawn from the cleaning tank via line 21. Systems for fluidization of the fines in the bottom of the cleaning tank and for withdrawal of the fines may be used which are similar to the systems used with slurry tank 2 and extraction column 9 although accumulation of the fines is less pronounced than with the coarse solids as encountered in the bottom of the extraction column.

Also, as described hereinbefore, a series of centrifuge-cleaning tank combinations and/or cyclone separator-cleaning tank combinations may be used. If a cyclone separator-cleaning tank combination is used in series with a centrifuge-cleaning tank combination, it is preferable that the former precede the latter in the arrangement.

The fines withdrawn via line 21 are then combined with the coarse solids in line 13. The combined solids together with residual solvent are then introduced to centrifuge 22. In the centrifuge, the residual solvent is separated from the combined solids and discharged through line 23. The combined solids are discharged through line 24 and fed to a heating zone which, for purposes of illustration, is depicted as an enclosed heated auger 25. The solids feed to the auger may be introduced entirely at the entry end thereof or at multiple locations along its length. The auger is heated by any conventional means to provide temperatures which are at least sufficient to vaporize the residual solvent present. Such heating means may include a surrounding jacket through which heated fluids are circulated or on electrical resistance heating means. As the solids continuously move through the heating zone, any residual solvent is volatilized and serves to further strip contaminants which may not have been dissolved and removed through earlier solvent treatment. The volatilized solvent together with stripped contaminants are removed from the heating zone through line 26 and the cleaned solids are discharged through line 27 for disposal.

Figure 2:
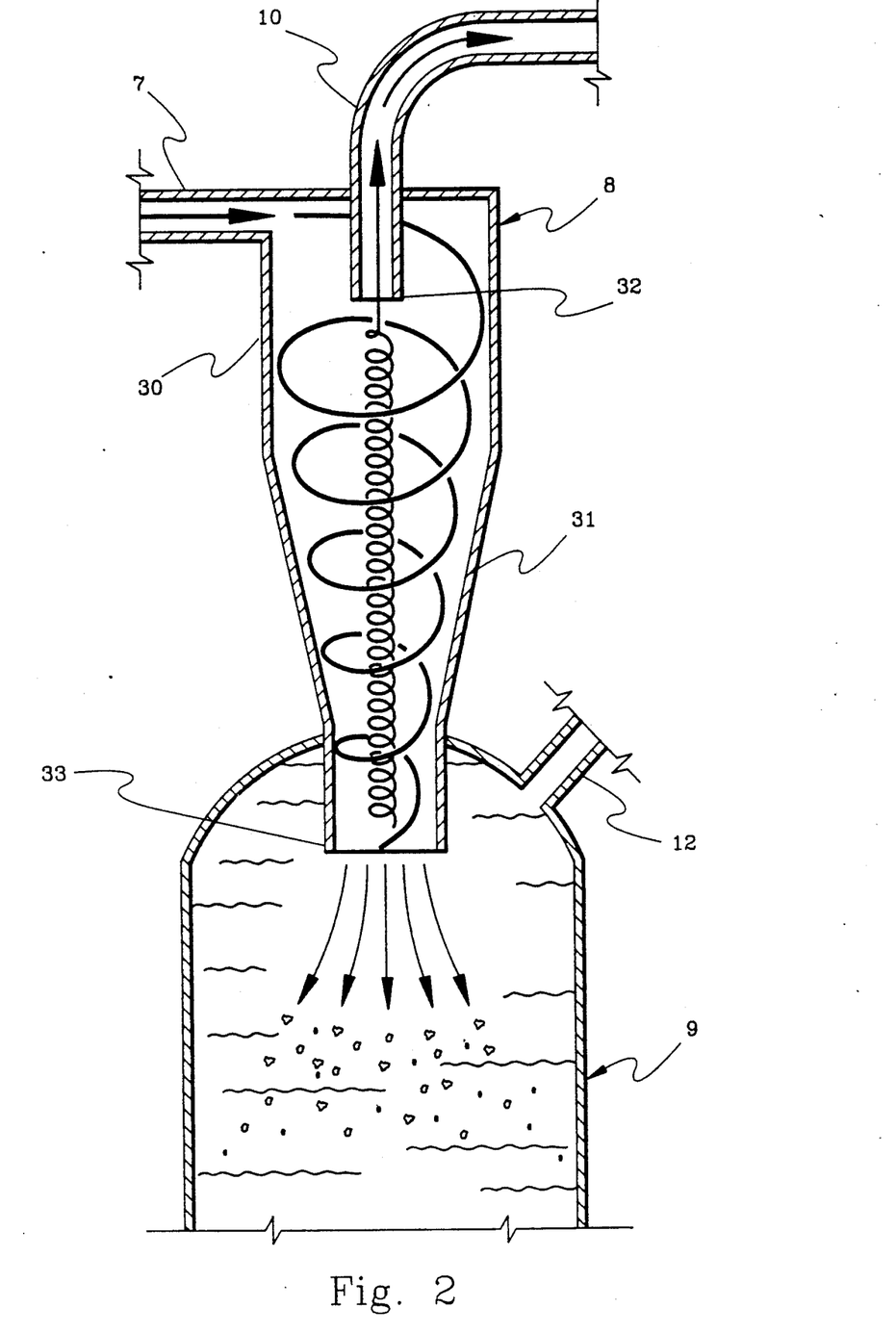
FIG. 2 is a partial schematic diagram illustrating the cyclone separator integrally positioned at the top of the extraction column.

With reference to FIG. 2, a more detailed view is shown of the cyclone separator 8 integrally positioned at the top of extraction column 9 as depicted in FIG. 1.

In general, and as known in the art, the cyclone separator 8 comprises an upper cylindrical section 30 and a lower frusto-conical section 31. The slurry introduced to the cyclone separator via line 7 enters the upper portion of cylindrical section 30 through either a tangential feed entry or an involuted feed entry (not shown in detail). The involuted feed entry is preferred since it minimizes turbulence in the feed entry.

The overflow 10 is positioned axially through the top of the cylindrical section and extends downward terminating in what is generally known as a vortex finder 32. The vortex finder 32 is located in an area within the separator that is below the feed entry so as to avoid mixing of the slurry feed with the vortex mixture.

The frusto-conical section 31 of the separator is mounted on and extends through the top of the extraction column 9 and terminates at its lower end in what is generally known as a cone apex 33 to form the underflow from the separator. In operation, the cone apex of the separator is at least contiguous with the upper level of the body of solvent in the extraction column and preferably slightly immersed in the solvent to assure that the necessary back pressure is applied to the cyclone separator 8. It is this feature that allows the orifice of the cone apex to be sized larger than would normally be considered necessary to achieve discharge of the majority of the solvent through the overflow yet at the same time permit free flow of the coarse particles through the cone apex. Preferably, the diameter of the cone apex should be about three times larger than the largest particle to avoid plugging.

As the slurry enters the cyclone separator, the tangential velocity of the slurry establishes a centrifugal force field. The slurry spirals downward against the separator wall through the cylindrical section 30 and the frusto-conical section 31. Near the cone apex 33, most of the solvent and some fines spiral back upward axially through the central or core area of the separator and exit through the vortex finder 32 The centrifugal force imparted by the spiral motion forces the heavier coarse solids in the slurry against the separator wall where they gravitate toward the cone apex 33 and are directly discharged as the underflow into the body of solvent in the extraction column 9. A minor portion of the solvent containing dissolved contaminants is also discharged with the coarse solids.

The coarse solids together with some solvent containing dissolved contaminants discharged from the underflow into the body of solvent in the extraction column becomes widely dispersed in the solvent. The contaminated solvent entering with the coarse solids quickly becomes homogeneous with the solvent in the upper region of the extraction column which is withdrawn from the extraction column through line 12. As the coarse solids fall downwardly through the extraction column, the contaminants on the solids become dissolved in the solvent and are carried upward in the column.

Figure 3:
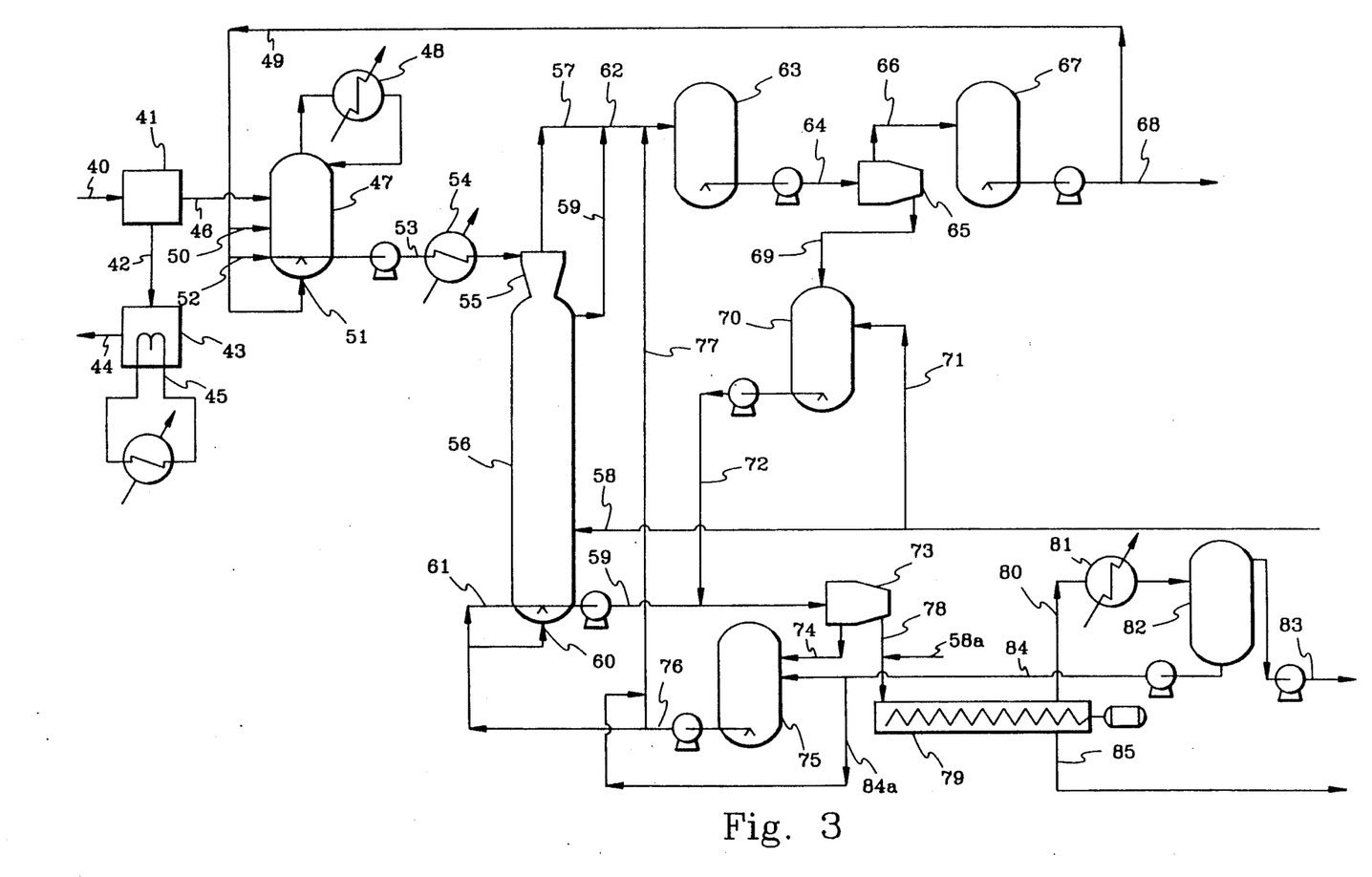
FIG. 3 is a schematic diagram illustrating a more detailed embodiment of the invention with particular application to cleaning drill cutting solids.

With reference to FIG. 3, a further embodiment of the invention is shown in the context of application to cleaning drill cutting solids. As shown therein, drilling mud containing oil-contaminated drill cutting solids as obtained from a wellbore are introduced via line 40 to a solids separator 41, e.g. a shale shaker. The drilling mud from which the drill cutting solids have been removed in the solids separator is taken through line 42 to mud pit 43 for recycle to the wellbore through line 44. The mud may be cooled before recycle such as by cooling coil 45 placed in the mud pit. Other known cooling means may also be used. Alternatively, the drilling mud containing oil-contaminated drill cutting solids in line 40 may be collected in a holding pit prior to introduction to the solids separator 41 wherein the holding pit is fitted with cooling means. This arrangement has the advantage of cooling the drill cutting solids as well as the mud and reducing volatile emissions from the solids separator.

The oil-contaminated drill cutting solids are taken from the solids separator 41 via line 46 and are introduced to a collection and feed tank 47. Line 46 may be fitted with suitable cooling means to cool the drill cutting solids before entering tank 47 to reduce any tendency to volatilize the solvent if the solids are not already sufficiently cool. Alternatively, rather than cooling the drill cutting solids prior to being introduced to tank 47 the hot solids may be added directly to the tank wherein they become cooled by volatilization of the solvent. In this case, the solvent vapors can then be withdrawn and condensed by heat exchange means 48 with return of the condensed solvent to tank 47.

As a further alternative, a positive displacement pump, such as a pump commonly used to pump cement slurry, may be inserted in line 46 to move the oil-contaminated drill cutting solids from the separator 41 to the collection and feed tank 47 under pressure. In this manner solvent volatilization may be minimized and the potential for emissions from tank 47 is reduced without the need for heat exchange means 48.

A suitable solvent for the oil contaminating the drill cutting solids is also introduced to collection and feed tank 47 by way of line 49 through at least side entry 50 to form a slurry.

The solvent may be any solvent which will dissolve the contaminating oil. Preferably, the solvent employed should be a liquid at ambient temperatures and pressures so as to permit operation at atmospheric pressure and minimize loss of solvent to the atmosphere. Some examples of suitable solvents include saturated $C_5+$ hydrocarbons, particularly pentane, cyclopentane and hexane. Saturated hydrocarbons having more than six carbon atoms may be less desirable because of increasingly higher temperature requirements required for volatilization during a later removal stage. It is preferable to employ a solvent which has a boiling point below the boiling point of water so as to avoid undue energy load on the heated auger caused by driving off significantly more water before volatilization of the solvent can occur when higher boiling point solvents are used. Halogenated hydrocarbons are also highly suitable solvents, such as methylene chloride, ethylene dichloride, perchloroethylene, chloroform, methyl chloroform, carbon tetrachloride, trichloro-trifluoroethane, 1,1- dichloro-2,2,2-trifluoroethane and 1,1-dichloro-1-fluoroethane. Azeotropic mixtures are less desirable for the process of this invention because the oil dissolved in the solvent tends to change or disrupt the azeotropic properties, thus causing operational difficulties in reclaiming the solvent for further use.

In tank 47, the drill cutting solids mix with the solvent as they settle to the bottom of the tank. The drill cutting solids accumulating on the bottom of tank 47 may be maintained in a fluidized condition by introducing a portion of the solvent through one or more injection ports 51 in the bottom of the tank. The slurry of drill cutting solids and solvent is then withdrawn from tank 47 through line 53. A further portion of solvent may be introduced via line 52 to aid in withdrawal of the slurry. As mentioned in connection with FIG. 1, fluidization and withdrawal of the slurry may easily be accomplished using systems such as described in U.S. Pat. No. 3,993,359 and U.S. Pat. No. 4,586,852.

The slurry of drill cutting solids and solvent are then introduced via line 53 to a cyclone separator 55 which is mounted on the top of extraction column 56. A heat exchanger 54 may be inserted in line 53 to cool the slurry before introduction to the cyclone separator to further reduce the tendency for the solvent to vaporize and create possible emissions.

As previously described in connection with FIG. 1, the cyclone separator 55 is designed for liquid-solids separation and is sized so that the majority of the solvent together with fine particles of drill cutting solids are separated from the coarse drill cutting solids as the overflow and withdrawn through line 57. The coarse drill cutting solids with minor amounts of solvent exit the cyclone separator as the underflow directly into the solvent which is maintained at a level which is near the top of the extraction column 56 and at least contiguous with the underflow of the cyclone separator 55.

Fresh solvent is introduced near the bottom of the extraction column 56 through line 58 and solvent containing dissolved oil is withdrawn near the top of the column through line 59. The fresh solvent may contain some relatively low levels of dissolved oil depending on the cleaning desired but preferably is oil-free to achieve maximum cleaning effects. As the solvent flows upward through the column, the oil-contaminated coarse drill cutting solids fall by gravity to the bottom of the column in countercurrent relationship. During this countercurrent flow, the solids are intimately contacted by the solvent and the contaminating oil on the solids becomes dissolved in the solvent. The solvent level within the column is maintained so as to be at least contiguous with the point at which the underflow exits from the cyclone separator so that the underflow discharges directly into the body of solvent, i.e. discharge is essentially within the body of solvent. This is preferably achieved by operating the column in a manner wherein solvent consistently fills the column at all times. Suitable control means will be apparent to those skilled in the art to control the level of the solvent in the column during operation. These control means may involve indirectly controlling the volume discharged from the underflow of the cyclone separator by adjusting the volume withdrawn from the overflow, controlling the volume of solvent entering the lower portion of the extraction column, controlling the volume of solvent containing dissolved oil withdrawn from the upper portion of the extraction column and controlling the volume of cleaned coarse drill cutting solids together with some solvent withdrawn from the lower portion of the column.

By maintaining the solvent within the column at a level that is at least contiguous with the exit orifice (cone apex) of the underflow from the cyclone separator, the necessary back pressure is provided to the cyclone separator while still allowing the underflow orifice to be of adequate size to accommodate passage of the coarse drill cutting solids. On the other hand, the volume of solvent passing through the column must not be such that solvent is allowed to flood the cyclone separator and thereby disrupt the operation of the separator.

Coarse drill cutting solids which have been cleaned in the column are withdrawn from the bottom of the column through line 59. Similar to the collection and feed tank 47, the solids which accumulate in the bottom of the column are preferably kept in a fluidized state by introducing solvent through one or more ports 60 and the cleaned solids may be withdrawn, aided by introduction of additional solvent via line 61, using systems described in U.S. Pat. No. 3,993,359 and U.S. Pat. No. 4,586,852.

The fines together with oil-contaminated solvent exiting as the overflow 57 from the cyclone separator 55 are combined with the oily solvent withdrawn via line 59 from the upper portion of the extraction column 56 and are fed via line 62 to a holding tank 63 and then to centrifuge 65 via line 64 where the separated oily solvent is discharged through line 66. The holding tank 63 serves to avoid surges in the flow of the fines and oily solvent to the centrifuge as well as additional residence time for contact between the solvent and the fines allowing further dissolution of oil contaminating the fines.

The oily solvent discharged through line 66 is sent to holding tank 67 from which some of the oily solvent may be recycled via line 49 to the collection and feed tank 47. Any excess oily solvent is sent via line 68 to solvent reclamation for recovery of oil-free solvent. Reclamation may be accomplished by conventional fractionation means.

The separated fines are discharged from the centrifuge via line 69 to cleaning tank 70. Fresh solvent is fed to the cleaning tank via line 71 to form a slurry with the fines and dissolve more oil. For maximum cleaning, the solvent should be free from dissolved oil. However, for less extensive cleaning, the solvent may contain some dissolved oil. The fines together with some solvent containing dissolved oil are withdrawn from cleaning tank 70 via line 72. As with tank 47 and extraction column 56, some of the solvent may be introduced at the bottom of the cleaning tank and the fines may be withdrawn using systems as described in U.S. Pat. No. 3,993,359 and U.S. Pat. No. 4,586,852. If desired, a series of centrifuges and cleaning tanks may be employed to achieve even further cleaning of the fines.

The fines from line 72 are combined with the coarse drill cutting solids in line 58 and are introduced to centrifuge 73 where residual solvent is discharged via line 74 to holding tank 75 which serves to supply solvent via line 76 to the fluidization and withdrawal and injection port system at the bottom of extraction column 56. A portion of this solvent may be diverted via line 77 to combine with the fines and oily solvent in line 62.

In the event reuse of the solvent and removed oil is not desired, they may be incinerated for fuel value.

From centrifuge 73, the resulting solids, including fines, are discharged via line 78 and are fed to an enclosed heated auger 79. The auger is heated by conventional means as described in connection with FIG. 1. As the solids are continuously conveyed through the auger, they are subjected to elevated temperatures which serve to drive off any residual solvent. To conserve energy, these temperatures should be maintained at a minimum required to volatilize the solvent. Some water may also be volatilized and driven off with the solvent. This volatilization can also serve to further strip residual oil that may not have been dissolved and removed through the earlier solvent treatment, particularly if higher than minimum temperatures are used, such as about 250° F. to 350° F. As mentioned previously, stripping of residual oil from the solids can be further promoted by adding fresh solvent via line 58a to the solids being introduced to the heated auger. The additional fresh solvent may be introduced on an as needed basis to promote such further stripping of residual oil as might be desired such as when an upset occurs earlier in the process and the solids have higher than normal residual oil contents when discharged from centrifuge 73. The volatilized materials are removed from the auger through line 80, condensed in heat exchanger 81 and fed to decant tank 82. In the decant tank, any water, which is immiscible with the solvent, separates from the solvent and is withdrawn via line 83 for further treatment and disposal. The solvent is withdrawn via line 84 and fed to holding tank 75. Alternatively, the solvent may be shunted around holding tank 75 via line 84a directly to line 77.

It is pointed out that utilization of a solvent boiling between about 80° F. and about 150° F. allows the solvent to be removed without significant water removal thus substantially reducing energy requirements of the system and minimizing water handling in the solvent recovery system.

Cleaned and dried drill cutting solids, including fines, are discharged from the auger 79 through line 85 for disposal.

Thus, having described the invention in detail, it is to be understood that the foregoing description and drawings are not intended to be limiting, but only exemplary of the inventive features which are defined in the claims.

What is claimed is:

1. A process for cleaning solids contaminated with a solvent-soluble contaminant which comprises:
   (a) mixing contaminated solids comprising a mixture of fine and coarse particles with a solvent for the solvent-soluble contaminant to form a slurry,
   (b) introducing the resulting slurry to a cyclone separation zone,
   (c) withdrawing a first stream from an overflow of the cyclone separation zone, said first stream comprising a mixture of fine particles and a major amount of solvent containing a relatively high concentration of dissolved contaminant,
   (d) separating the fine particles having reduced contamination from the first stream and contacting said separated fine particles with additional solvent in a cleaning zone, said additional solvent containing no more than a relatively low concentration of dissolved contaminant, and withdrawing a mixture of said fine particles and at least some of said additional solvent from the cleaning zone,
   (e) withdrawing a second stream from an underflow of the cyclone separation zone, said second stream comprising a mixture of coarse particles and a minor amount of solvent containing a relatively high concentration of dissolved contaminant, and introducing said second stream directly into a body of solvent contained in an upper portion of an extraction zone, said underflow being contiguous with or immersed in said body of solvent to the extent that back pressure is provided to the cyclone separation zone without flooding of said cyclone separation zone,
   (f) introducing a solvent containing no more than a relatively low concentration of dissolved contaminant into the extraction zone adjacent the lower portion thereof and counter-currently contacting said second stream with said solvent in said extraction zone,
   (g) withdrawing a solvent stream containing a relatively high concentration of dissolved contaminant adjacent the upper portion of the extraction zone and withdrawing coarse particles having reduced contamination together with some solvent containing no more than a relatively low concentration of dissolved contaminant from the lower portion of the extraction zone,
   (h) combining the withdrawn coarse particles and solvent from step (g) with the withdrawn fine particles and solvent from step (d) and centrifuging the combination to remove the solvent from the coarse and fine particles and recovering the centrifuged coarse and fine particles having reduced contamination for disposal.

2. The process of claim 1 which includes the step of introducing the centrifuged coarse and fine particles from step (h) to a heating zone and conveying said coarse and fine particles through said zone at temperatures sufficient to volatilize substantially all residual solvent from the particles to provide substantially solvent-free particles of solids having reduced contamination for recovery and disposal.

3. The process of claim 1 wherein at least a portion of the solvent containing a relatively high concentration of dissolved contaminant from the first stream separation in step (d) is recycled for use as at least a part of the solvent for step (a).

4. The process of claim 1 wherein at least part of the solvent containing dissolved contaminant separated in one or more of steps (d), (h), and (i) is fractionated to recover substantially contaminant-free solvent and recycled for use as the solvent in the cleaning zone of step (d) and/or the solvent in step (f).

5. The process of claim 1 wherein the fine particles of solids are separated from the first stream in step (d) by centrifuging.

6. The process of claim 5 wherein step (d) is repeated at least twice before the withdrawn fine particles and solvent are combined with the withdrawn coarse particles and solvent in step (h).

7. The process of claim 1 wherein the fine particles of solids are separated from the first stream in step (d) by cyclone separation.

8. The process of claim 7 wherein step (d) is repeated at least twice before the withdrawn fine particles and solvent are combined with the withdrawn coarse particles and solvent in step (h).

9. The process of claim 1 wherein the fine particles of solids are separated from the first stream in step (d) by a combination of centrifuging and cyclone separation.

10. The process of claim 1 wherein one or more of (i) the amount of solvent introduced to the extraction zone in step (f), (ii) the amount of solvent containing a relatively high concentration of contaminant withdrawn from the extraction zone in step (g), (iii) the amount of the first stream withdrawn as the overflow from the cyclone separator zone in step (c), and (iv) the amount of coarse particles with some solvent withdrawn from the extraction zone in step (g), are controlled so as to maintain the body of solvent in the extraction zone at least contiguous and in contact with the underflow of the cyclone separation zone.

11. A process for cleaning drill cutting solids contaminated with oil which comprises:
(a) mixing the oil-contaminated drill cutting solids comprising both fine and coarse particles with a solvent for the oil to form a slurry,
(b) introducing the resulting slurry to a cyclone separation zone,
(c) withdrawing a first stream from an overflow of the cyclone separation zone, said first stream comprising a mixture of fine particles of drill cutting solids and a major amount of solvent containing a relatively high concentration of dissolved oil,
(d) separating the fine particles of drill cutting solids having reduced oil contamination from the first stream and contacting said separated fine particles with additional solvent in a cleaning zone, said additional solvent containing no more than a relatively low concentration of dissolved oil, and withdrawing a mixture of said fine particles and at least some of said additional solvent from the cleaning zone,
(e) withdrawing a second stream from an underflow of the cyclone separation zone, said second stream comprising a mixture of coarse particles of drill cutting solids and a minor amount of solvent containing a relatively high concentration of dissolved oil, and introducing said second stream directly into a body of solvent contained in an upper portion of an extraction zone, said underflow being contiguous with or immersed in said body of solvent to the extent that back pressure is provided to the cyclone separation zone without flooding of said cyclone separation zone,
(f) introducing a solvent containing no more than a relatively low concentration of dissolved oil into the extraction zone adjacent the lower portion thereof and counter-currently contacting said second stream with said solvent in said extraction zone,
(g) withdrawing a solvent stream containing a relatively high concentration of dissolved oil adjacent the upper portion of the extraction zone and withdrawing coarse particles of drill cutting solids having reduced oil contamination together with some solvent containing no more than a relatively low concentration of dissolved oil from the lower portion of the extraction zone,
(h) combining the withdrawn coarse particles of drill cutting solids and solvent from step (g) with the withdrawn fine particles of drill cutting solids and solvent from step (d) and centrifuging the combination to remove the solvent from the coarse and fine particles,
(i) introducing the centrifuged coarse particles and fine particles of drill cutting solids from step (h) to a heating zone and conveying said coarse and fine particles through said zone at temperatures sufficient to volatilize substantially all residual solvent from said particles and recovering substantially solvent-free particles of drill cutting solids having reduced contamination for disposal.

12. The process of claim 11 wherein, prior to step (a), oil-contaminated drill cutting solids and drilling mud are withdrawn from a wellbore, the drilling mud is separated from the oil-contaminated drill cutting solids and the drilling mud is cooled before being recirculated to the wellbore.

13. The process of claim 11 wherein a portion of the solvent containing dissolved oil from the first stream separation in step (d) is recycled for use in step (a) to form the slurry.

14. The process of claim 13 wherein the remainder of the solvent containing dissolved oil is fractionated to recover substantially oil-free solvent for recycle to the process.

15. The process of claim 11 wherein separated solvent containing dissolved oil in step (h) is recycled to the extraction zone to assist in withdrawal of the coarse particles of drill cutting solids from the lower portion of said extraction zone in step (g).

16. The process of claim 11 wherein the mixture of contaminated drill cutting solids and solvent from step (a) is heat exchanged before introduction to the cyclone separation zone.

17. The process of claim 11 wherein the solvent introduced to the extraction zone in step (f) is free from any dissolved oil.

18. The process of claim 17 wherein the additional solvent used to contact the separated fine particles in said cleaning zone is free from any dissolved oil.

19. The process of claim 11 wherein the fine particles of drill cutting solids are separated from the first stream in step (d) by centrifuging.

20. The process of claim 11 wherein the fine particles of drill cutting solids are separated from the first stream in step (d) by cyclone separation.

21. The process of claim 11 wherein the fine particles of drill cutting solids are separated from the first stream in step (d) by a combination of centrifuging and cyclone separation.

22. The process of claim 11 wherein additional solvent is added to the centrifuged coarse and fine particles of drill cutting solids from step (h) prior to introduction to the heating zone.

23. An apparatus for cleaning solids contaminated with a solvent-soluble contaminant which comprises:
(a) slurry means for mixing contaminated solids, comprising a mixture of fine and coarse particles, with a solvent for the solvent-soluble contaminant,
(b) cyclone separation means connected to the slurry means for receiving and separating said slurry into a first stream comprising a mixture of fine particles and a major amount of solvent containing a relatively high concentration of dissolved contaminant and a second stream comprising a mixture of coarse particles and a minor amount of solvent containing a relatively high concentration of dissolved contaminant, said cyclone separation means including an overflow for withdrawing said first stream and an underflow for withdrawing said second stream, (c) an extraction column whose upper portion is integrally connected with the underflow of the cyclone separation means and adapted to receive said second stream while providing back pressure to said cyclone separation means, said extraction column having solvent inlet means near its lower portion for receiving solvent having no more than a relatively low concentration of dissolved contaminant, solvent outlet means near its upper portion for withdrawing solvent having a relatively high concentration of dissolved contaminant and a solids outlet near its lower portion below the solvent inlet means for discharge of coarse particles and some solvent, (d) separation means connected to the overflow of the cyclone separation means for receiving and separating said first stream into a solvent stream containing a relatively high concentration of dissolved contaminant and a fine particle stream, (e) cleaning means connected to separation means (d) for receiving and contacting said fine particle stream with additional solvent and having a solids outlet for discharge of fine particles and at least some solvent, (f) centrifuge means connected to the solids outlet of said cleaning means and the solids outlet of said extraction column for receiving and separating the combined fine and coarse particles from the solvent.

24. An apparatus according to claim 23 which includes heating means connected to the centrifuge means and adapted to receive the combined fine and coarse particles and volatilize the residual solvent to recover substantially solvent-free particles of solids having reduced contamination for disposal.

25. An apparatus according to claim 23 wherein means are provided to recycle at least a portion of the solvent stream separated in separation means (d) to the slurry means (a).

26. An apparatus according to claim 25 wherein means are provided to fractionate any remaining portion of the solvent stream separated in separation means (d) to recover substantially contaminant-free solvent.

27. An apparatus according to claim 23 wherein means are provided to fractionate separated solvent containing dissolved contaminant from one or more of separation means (d), the centrifuge means (f) and the heating means (g) to recover substantially contaminant-free solvent.

28. An apparatus according to claim 27 wherein means are provided to recycle the recovered substantially contaminant-free solvent to one or more of the slurry means (a), the cleaning means (e) and the extraction column (c).

29. An apparatus according to claim 23 wherein the heating means is an enclosed heated auger.

30. An apparatus according to claim 23 wherein the separation means (d) is a centrifuge means.

31. An apparatus according to claim 23 wherein the separation means (d) is a cyclone separation means 32. An apparatus according to claim 23 wherein the separation means (d) is a combination of a cyclone separation means and a centrifuge means.

33. An apparatus for cleaning drill cutting solids contaminated with oil which comprises:

(a) slurry means for mixing oil-contaminated drill cutting solids, comprising a mixture of fine and coarse particles, with a solvent for the oil, (b) cyclone separation means connected to the slurry means for receiving and separating said slurry into a first stream comprising a mixture of fine particles of drill cutting solids and a major amount of solvent containing a relatively high concentration of dissolved oil and a second stream comprising a mixture of coarse particles of drill cutting solids and a minor amount of solvent containing a relatively high concentration of dissolved oil, said cyclone separation means including an overflow for withdrawing said first stream and an underflow for withdrawing said second stream, (c) an extraction column whose upper portion is integrally connected with the underflow of the cyclone separation means and adapted to receive said second stream while providing back pressure to said cyclone separation means, said extraction column having solvent inlet means near its lower portion for receiving solvent having no more than a relatively low concentration of dissolved oil, solvent outlet means near its upper portion for withdrawing solvent having a relatively high concentration of dissolved oil and a solids outlet near its lower portion below the solvent inlet means for discharge of coarse particles of drill cutting solids and some solvent, (d) first centrifuge means connected to the overflow of the cyclone separation means for receiving and separating said first stream into a solvent stream containing a relatively high concentration of dissolved oil and a fine particle stream, (e) cleaning means connected to the first centrifuge means for receiving and contacting said fine particle stream with additional solvent and having a solids outlet for discharge of fine particles of drill cutting solids and some solvent, (f) second centrifuge means connected to the solids outlet of said cleaning means and the solids outlet of said extraction column for receiving and separating the combined fine and coarse particles of drill cutting solids from the solvent, (g) heating means connected to the second centrifuge means and adapted to receive the combined fine and coarse particles of drill cutting solids and volatilize the residual solvent to recover substantially solvent-free particles of drill cutting solids having reduced contamination for disposal.

34. An apparatus according to claim 33 wherein means are provided to introduce the oil-contaminated drill cutting solids to the slurry means which include means to cool said solids.

35. An apparatus according to claim 33 wherein a sequence of more than one combination of first centrifuge means (d) and cleaning means (e) are used with the solids outlet of a preceding cleaning means is connected to the solids inlet of the succeeding cleaning means.

36. An apparatus according to claim 33 wherein means are provided to introduce additional solvent to the combined fine and coarse particles of drill cutting solids prior to the heating means.

37. An apparatus according to claim 33 wherein separator means are provided to receive drilling mud containing oil-contaminated drill cutting solids from a wellbore and to separate the oil-contaminated drill cutting solids from the drilling mud and feed means are provided to feed the separated oil-contaminated drill cutting solids to the slurry means.

38. An apparatus according to claim 37 wherein the feed means include means to pump the oil-contaminated drill cutting solids under pressure to the slurry means.

* * * * *

UNITED STATES PATENT AND TRADEMARK OFFICE
CERTIFICATE OF CORRECTION

PATENT NO. : 5,053,082

DATED : October 1, 1991

INVENTOR(S) : David A. Flanigan, Joe K. Heilhecker and Robert E. Williams

It is certified that error appears in the above-identified patent and that said Letters Patent is hereby corrected as shown below:

Title Page, change the filing date from "February 28, 1991" to --February 28, 1990--.

Signed and Sealed this

Nineteenth Day of January, 1993

Attest:

DOUGLAS B. COMER

*Attesting Officer*  Acting Commissioner of Patents and Trademarks